United States Patent
Hur et al.

(10) Patent No.: US 7,871,200 B2
(45) Date of Patent: Jan. 18, 2011

(54) AEROSTATIC BEARING SPINDLE SYSTEM USING UNIDIRECTIONAL POROUS METAL

(75) Inventors: Bo Young Hur, Jinju (KR); Yong Su Um, Busan (KR); Jae Hong Yoon, Geyongsangnam-do (KR)

(73) Assignee: Industry-Academic Cooperation Foundation Gyeongsang National University (KR)

( * ) Notice: Subject to any disclaimer, the term of this patent is extended or adjusted under 35 U.S.C. 154(b) by 407 days.

(21) Appl. No.: 12/166,726

(22) Filed: Jul. 2, 2008

(65) Prior Publication Data
US 2009/0010579 A1    Jan. 8, 2009

(30) Foreign Application Priority Data
Jul. 2, 2007    (KR) .................. 10-2007-0066010

(51) Int. Cl.
*F16C 32/06*    (2006.01)
(52) U.S. Cl. .................. 384/279; 384/114; 384/902
(58) Field of Classification Search .................. 384/100, 384/114, 279, 902
See application file for complete search history.

(56) References Cited

U.S. PATENT DOCUMENTS

| | | | | |
|---|---|---|---|---|
| 3,058,559 A | * | 10/1962 | Ohrnberger | .................. 384/100 |
| 3,639,074 A | * | 2/1972 | Killick | .................. 384/100 |
| 6,342,306 B1 | * | 1/2002 | Ozawa et al. | .................. 384/902 |
| 6,872,002 B2 | * | 3/2005 | Tomita et al. | .................. 384/12 |

FOREIGN PATENT DOCUMENTS

| | | | |
|---|---|---|---|
| JP | 2001-27241 A | | 1/2001 |
| JP | 2001027240 A | * | 1/2001 |

* cited by examiner

*Primary Examiner*—Thomas R Hannon
(74) *Attorney, Agent, or Firm*—Perkins Coie LLP

(57) ABSTRACT

Provided is an aerostatic bearing spindle system using a unidirectional porous metal. The aerostatic bearing spindle system using a unidirectional porous metal may be used to serve as bearings in a region is in contact with the unidirectional porous metals when the unidirectional porous metals are rotated at a high speed, the unidirectional porous metals being manufactured with high porosity and directionality using the metallurgical method.

3 Claims, 5 Drawing Sheets

0.4% MPa, POROSITY : 44.9%   0.8% MPa, POROSITY : 36.6%

| SURFACE A | SURFACE B | SURFACE C |

| SURFACE A | SURFACE B | SURFACE C |

AEROSTATIC BEARING SPINDLE SYSTEM USING UNIDIRECTIONAL POROUS METAL

CROSS-REFERENCE TO RELATED APPLICATIONS

This application claims the priority of Korean Patent Application No. 2007-66010 filed on Jul. 2, 2007, in the Korean Intellectual Property Office, the disclosure of which is incorporated herein by reference.

BACKGROUND OF THE INVENTION

1. Field of the Invention

The present invention relates to an aerostatic bearing spindle system using a unidirectional porous metal, and more particularly, to an aerostatic bearing spindle system using a unidirectional porous metal capable of being used to serve as bearings in a region is in contact with the porous metals when the porous metals are rotated at a high speed, the porous metals being manufactured to have high porosity and directionality.

2. Description of the Related Art

In general, devices using an air bearing system as a high-speed rotating apparatus have problems that, since a motor as a heat source is installed inside the air bearing system, the main axis may be deformed and burnt on due to the vibration, abrasion and friction heat when the main axis is rotated at a high speed, which adversely affects the precision and stability of machine tools.

Also, grooves (diameter: 0.2 to 0.3 mm) are formed in a sintered material or a metal pipe that has been used as a bearing material in the conventional air bearing systems, and an oil film is formed between the axis and the bearings by allowing air to flow in and out. As a result, the formed oil film serves as the bearings that prevent the direct contact between the axis and the bearings.

However, the balancing of the entire air bearing system may be made unstable since the pressure distribution of air may be made non-uniform due to the limitations of the precision machining technology to form micro grooves onto the conventional bearing materials, and therefore the hardness of the aerostatic bearing spindle system may be deteriorated due to the air hammer phenomenon, etc.

SUMMARY OF THE INVENTION

The present invention is designed to solve the problems of the prior art, and therefore it is an object of the present invention to provide an aerostatic bearing spindle system using a unidirectional porous metal having a directionality so that the flow distribution of air can be made uniform, wherein the unidirectional porous metal is prepared using a metallurgical method and applied to air bearings, and the aerostatic bearing spindle system has a simple structure, and may reduce the deformation and burning on of the main axis caused by vibration, abrasion and friction heat to the maximum extent, and simultaneously secure the balancing of the entire air bearing system and remove an air hammer phenomenon since the air bearings made of unidirectional porous metal are installed in a region that is in direct contact with the main axis when the main axis is rotated at a high speed.

According to an aspect of the present invention, there is provided an aerostatic bearing spindle system using a unidirectional porous metal including a motor housing; a bearing housing disposed in contact with the motor housing and formed integrally in the motor housing; a main axis installed through inner central regions of the motor housing and the bearing housing; a motor installed to surround the main axis disposed inside the motor housing; and a plurality of unidirectional porous metal bearings installed to coaxially surround a circumferential surface of the main axis disposed inside the bearing housing and having a plurality of pores formed therein, the pores having a predetermined directionality with respect to the circumferential surface, wherein an air inlet is formed integrally in a predetermined space between the motor housing and the bearing housing and arranged in parallel to the main axis, and an air outlet is formed integrally in the other space of the motor housing and the bearing housing and arranged in parallel to the main axis, a plurality of air supply channels are formed integrally between the air inlet and each of the unidirectional porous metal bearings, and air supply grooves are formed integrally between the air supply channels and each of the porous metal bearing, a plurality of the porous metal bearings are installed spaced apart from each other, and metal rings having an exhaust groove formed thereon are each installed between the porous metal bearings, and an exhaust channel communicating with the exhaust groove is formed integrally between the metal ring and the air outlet.

Here, a plurality of the pores formed in the circumferential surfaces of the unidirectional porous metal bearings may be formed in a 90° direction with respect to the central axes of the unidirectional porous metal bearings.

Also, a plurality of the pores formed in the circumferential surfaces of the unidirectional porous metal bearings may be formed in a 45° direction with respect to the central axes of the unidirectional porous metal bearings.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
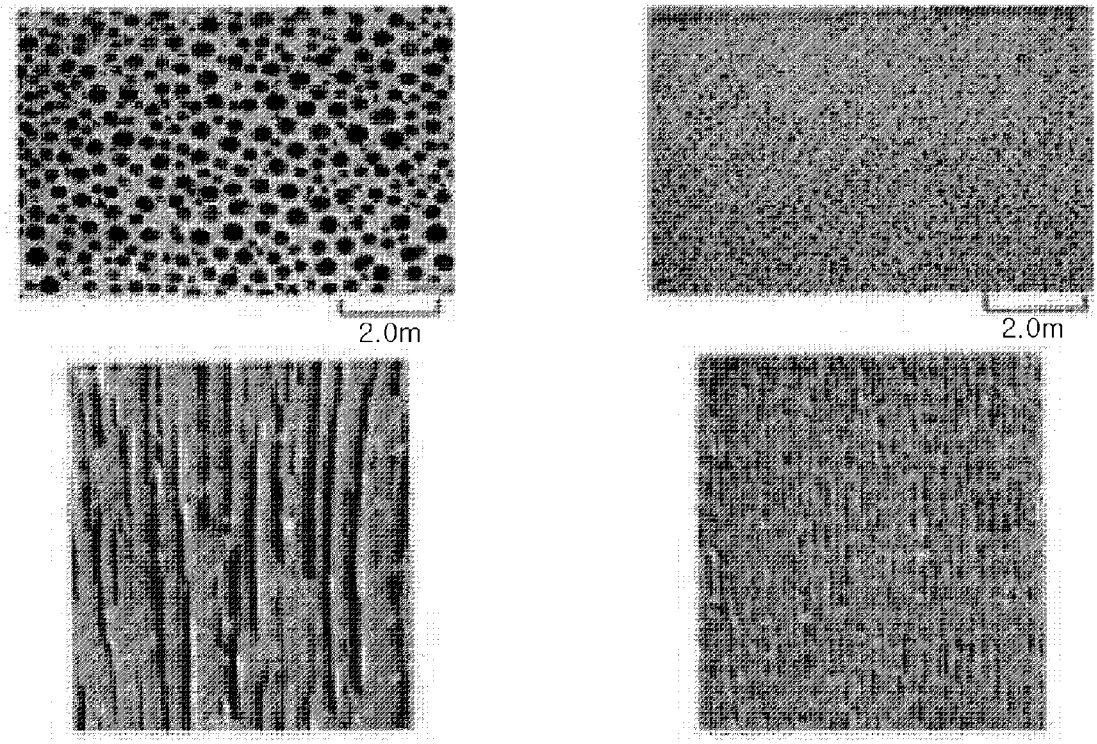
FIG. 1 is an optical microscopic photograph taken from a transverse section and a longitudinal section of porous metal copper (Cu) having a unidirectional structure.

FIG. 1 is an optical microscopic photograph taken from a transverse section and a longitudinal section of a unidirectional porous metal. That is, FIG. 1 shows an optical microscopic photograph taken from a transverse section and a longitudinal section of porous metals having unidirectional multi pores as the copper (Cu) test blocks prepared under gas pressures of 0.4 MPa and 0.8 MPa, respectively.

A unidirectional porous copper having an average pore size of approximately 0.4 mm and a porosity of 44.9% may be obtained in the case of the test block prepared under the gas pressure of 0.4 MPa. A unidirectional porous material having an average pore size of approximately 0.1 mm and a porosity of 36.6% may be obtained in the case of the test block prepared under the gas pressure of 0.8 MPa.

As shown in the longitudinal section photograph, it is revealed that the unidirectional pores grow to a length from approximately 200 mm up to 200 mm in a growth direction (a proceeding direction of a solid-liquid interface).

As seen from the above results, the size and porosity of the pores are decreased as the gas pressure increases gradually, and therefore a material having a desired pore size and porosity may be prepared by controlling the gas pressure and other various parameters.

Figure 2:
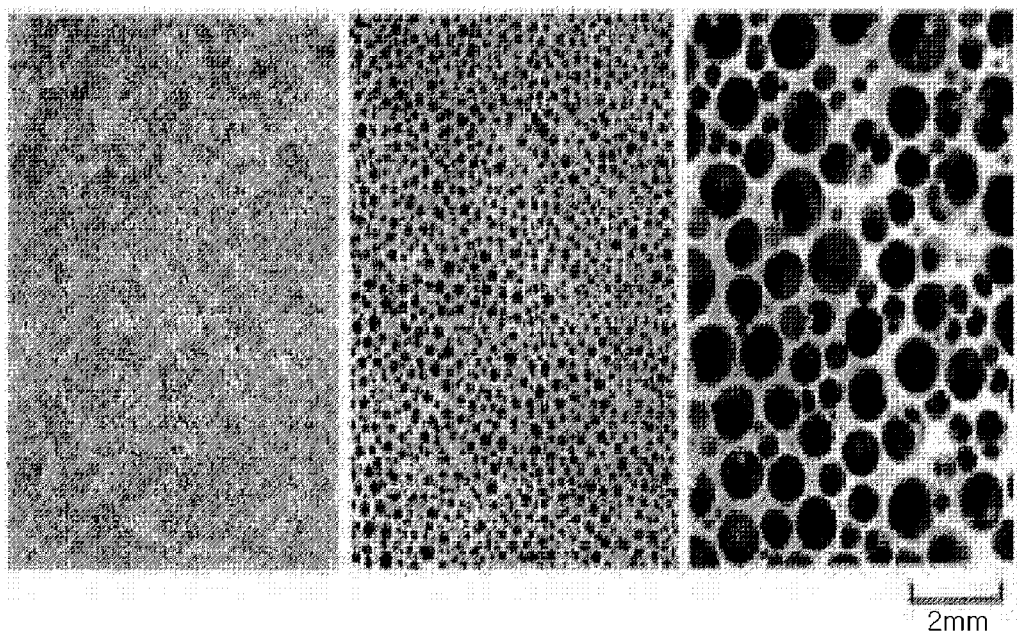
FIG. 2 is a photograph illustrating unidirectional porous metal copper (Cu) having various pore sizes.

FIG. 2 is a photograph illustrating unidirectional porous metal copper (Cu) having various pore sizes. That is, FIG. 2 shows a photograph of a copper (Cu) test block having various pore sizes and porosity, which is prepared by controlling the gas pressure and other parameters.

Figure 3:
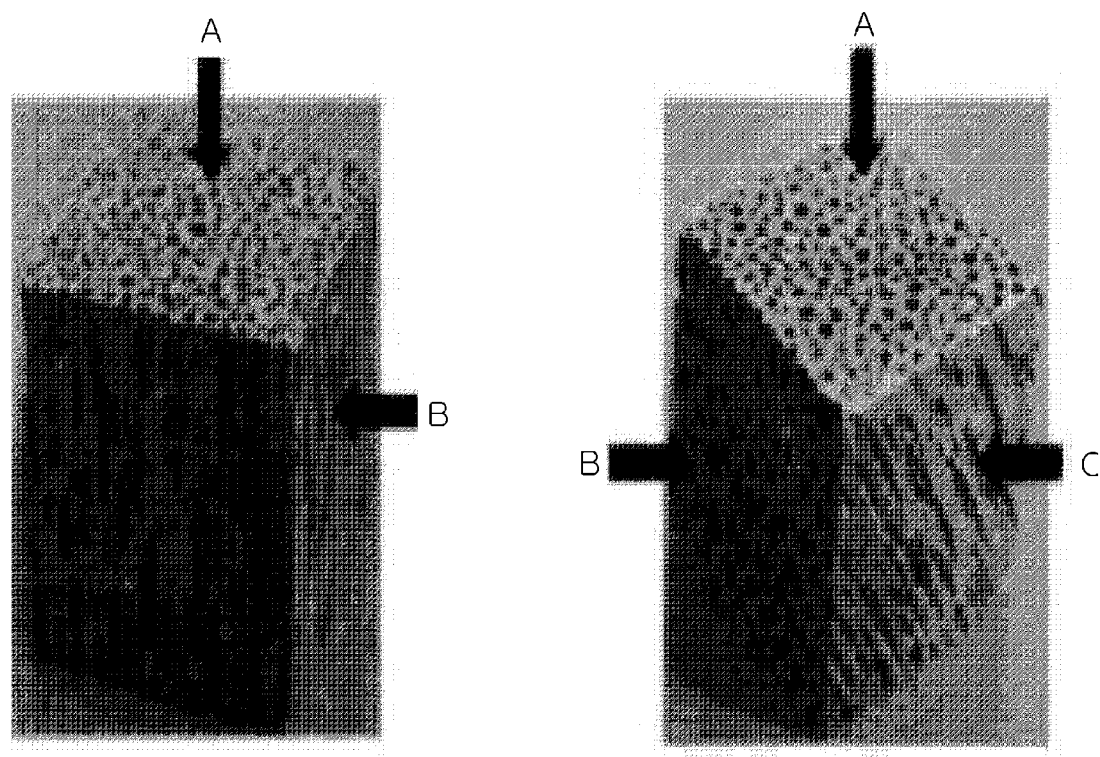
FIG. 3 is a photograph illustrating hardness test blocks of the unidirectional porous metal copper (Cu)

FIG. 3 is a photograph illustrating hardness test blocks of the unidirectional porous metal copper (Cu). In order to measure the hardness of the copper (Cu) test blocks prepared in FIGS. 1 and 2, the test blocks having a pore size of 4 mm are cut into pieces having a size of 1×1×1 cm, and each position of the cut test blocks to be grown is indicated, depending on the growth direction of pores. Then, the cut test blocks are subject to a Vickers hardness test.

Table 1 is illustrating the hardness measurement results of the unidirectional porous metal copper (Cu). In table 1, when the growth direction of pores is 90° with respect to the central axes of the unidirectional porous metal copper, the unidirectional porous metal copper has the highest hardness, and also shows a relatively uniform hardness value of approximately 50 Hv regardless of the growth direction of pores.

| TEST BLOCKS | | NO. OF MEASUREMENTS | | | | | AVERAGE |
|---|---|---|---|---|---|---|---|
| | | 1 | 2 | 3 | 4 | 5 | |
| GROWTH DIRECTION OF PORES (90°) | A | 55.8 | 61.1 | 56.1 | 58.7 | 62.5 | 58.84 |
| | B | 41.7 | 47.8 | 46.6 | 50.6 | 49.9 | 47.32 |
| GROWTH DIRECTION OF PORES (45°) | A | 52.7 | 49.6 | 50.2 | 54.8 | 49.3 | 51.32 |
| | B | 49.7 | 47.5 | 44.4 | 41.5 | 46.4 | 45.90 |
| | C | 49.2 | 53 | 54.9 | 59.2 | 52.7 | 53.80 |

Figure 4:
FIG. 4 is a photograph illustrating the analysis results of the prepared copper (Cu) test block using a scanning electron microscope (SEM)
Figure 4:
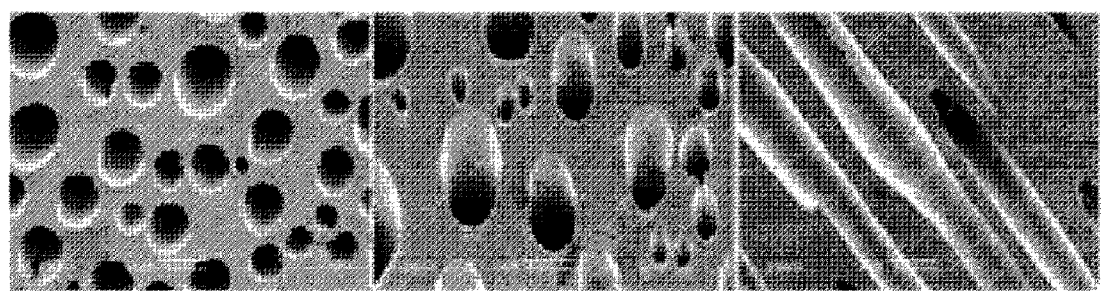

FIG. 4 is a photograph illustrating the analysis results of the prepared copper (Cu) test block using a scanning electron microscope (SEM). In FIG. 4, the pores are formed in good shape and there is no fissure found in the pores.

Figure 5A:
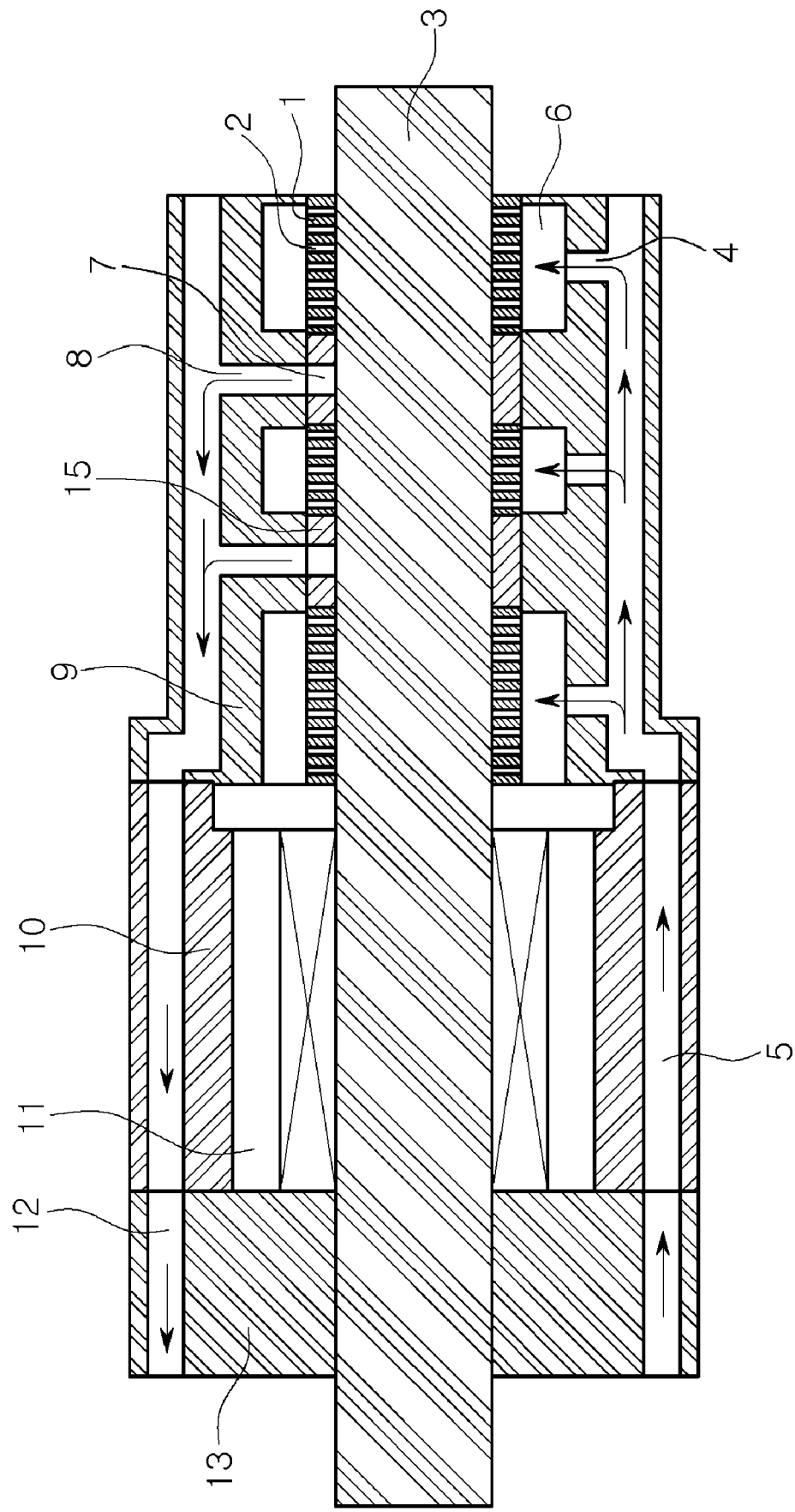
FIG. 5A is a perspective view illustrating one example of using a unidirectional porous metal material as an air bearing.
Figure 5B:
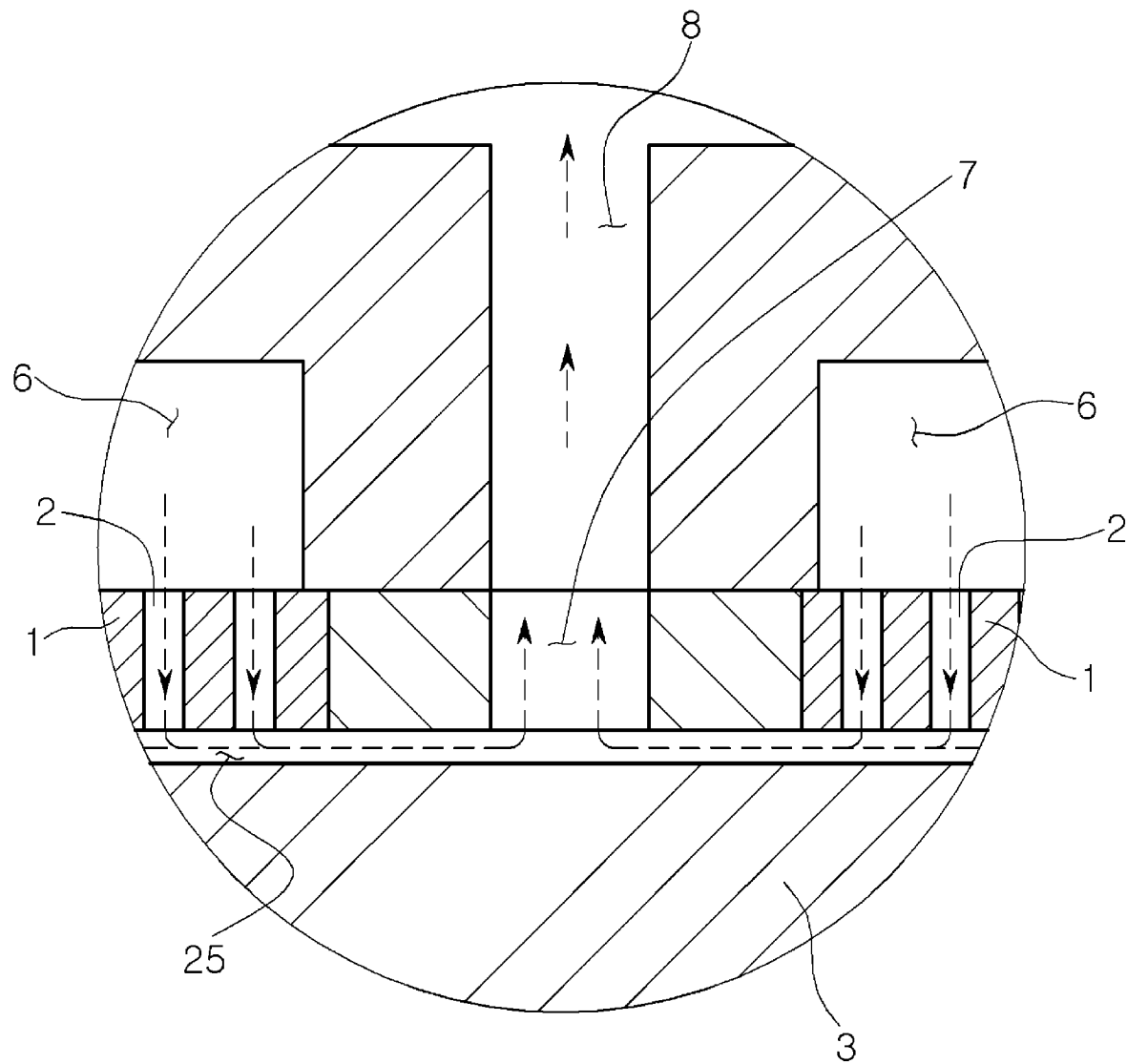
FIG. 5B is an exploded view illustrating one portion of the unidirectional porous metal material as shown in FIG. 5B.

FIG. 5A is a perspective view illustrating one example of using a unidirectional porous metal material as an air bearing. FIG. 5A is a representative view of the present invention. And, FIG. 5B is an exploded view illustrating one portion of the unidirectional porous metal material as shown in FIG. 5A.

The aerostatic bearing spindle system according to one embodiment of the present invention is characterized in that a motor 11 rotating the main axis is installed inside the aerostatic bearing spindle system.

The aerostatic bearing spindle system according to one embodiment of the present invention mainly includes a motor housing 10; a bearing housing 9 disposed in contact with the motor housing 10 and formed integrally in the motor housing 10; a main axis 3 installed through inner central regions of the motor housing 10 and the bearing housing 9; a motor 11 installed to surround the main axis 3 disposed inside the motor housing 10; and a plurality of unidirectional porous metal bearings 1 installed to coaxially surround a circumferential surface of the main axis 3 disposed inside the bearing housing 9.

In this case, a plurality of the porous metal bearings 1 are installed spaced apart from each other, and metal rings 15 are interposed between the respective porous metal bearings 1. An exhaust groove 7 is formed in an upper portion of the metal ring 15.

A plurality of pores 2 having a predetermined directionality are formed in each of the porous metals 1, and therefore the air may flow through the pores 2.

Also, an air inlet 5 may be formed integrally in predetermined space between the motor housing 10 and the bearing housing 9 and arranged in parallel to the main axis 3, and an air outlet 12 may be formed integrally in the other space of the motor housing 10 and the bearing housing 9 and arranged in parallel to the main axis 3. In this case, a plurality of air supply channels 4 are formed integrally between the air inlet 5 and the unidirectional porous metal bearings 1 to supply the air, and the air passed through the air supply channels 4 is then supplied to the pores 2 via air supply grooves 6. An exhaust groove 7 and an exhaust channel 8 are formed between the porous metal bearings 1 and the air outlet 12 to discharge the air, so that the exhaust groove 7 and the exhaust channel 8 can communicate with each other.

Figure 6:
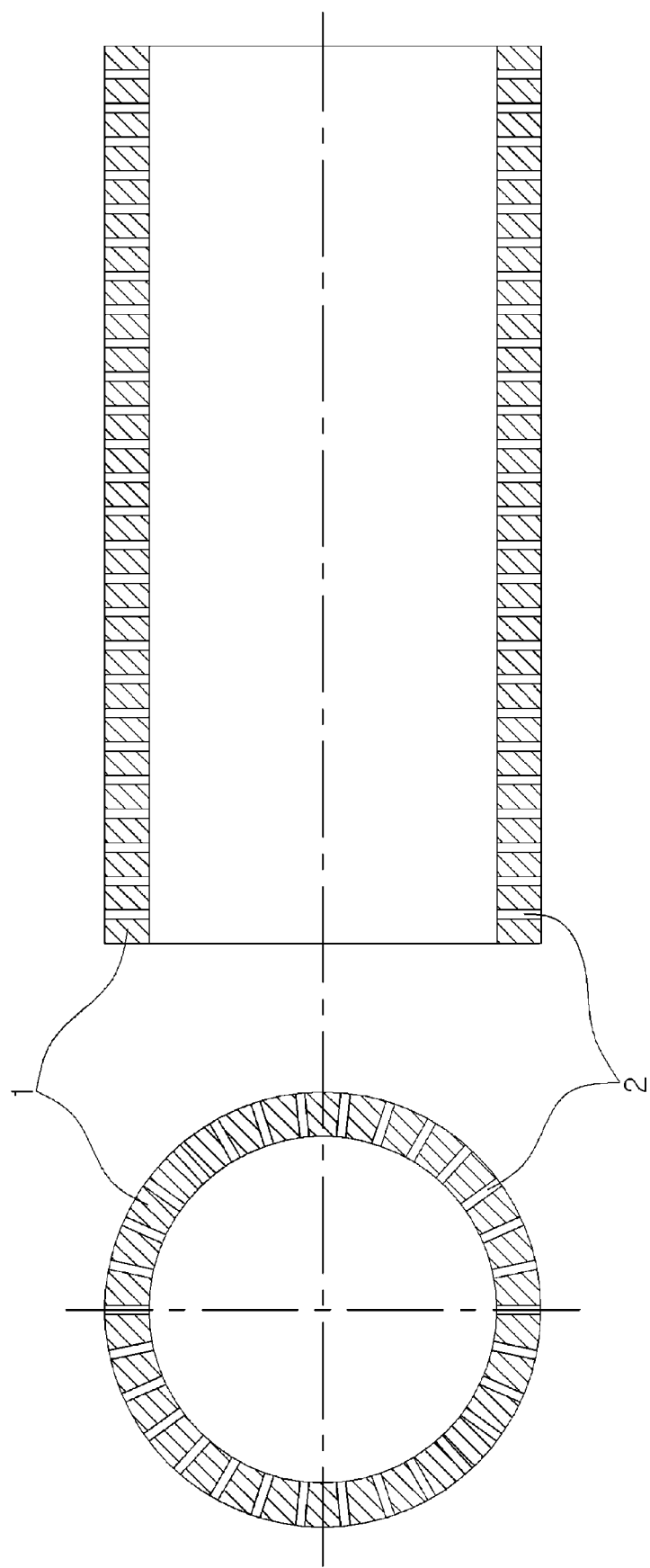
FIG. 6 is a cross-sectional view illustrating that pores in the unidirectional porous metal used as the air bearing are formed at an angle of 90° with respect to the central axis of the unidirectional porous metal.

The unidirectional porous metal bearings 1 may have pores formed with a predetermined directionality, as shown in FIGS. 3 and 4. In this case, a porous metal having pores formed in a 90° direction with respect to the central axis of the unidirectional porous metal bearings 1 may be prepared (see FIG. 6). According to another embodiment of the present invention, a porous metal having pores formed in a 45° direction with respect to the central axis of the unidirectional porous metal bearings 1 may also be prepared.

The unidirectional porous metal bearings 1 function as bearings in a space between the bearing housing 9 and the main axis 3. In this case, when the air is allowed to flow between a plurality of the pores 2 formed in the unidirectional porous metal bearings 1, an oil film is formed by the air between the main axis and the bearings, which facilitates the high-speed rotation of the main axis 3.

Reference numeral 13 represents an air entrance cover.

Hereinafter, an operation of the aerostatic bearing spindle system according to one embodiment of the present invention will be described in detail.

When the motor 11 is rotated at a high speed by a power supply, the main axis 3 is rotated due to the rotation of the motor 11. In this case, when the air is supplied to the porous metal bearings 1 via the air inlet 5, the air supply channel 4 and the air supply groove 6, the supplied air is passed through a plurality of the pores 2 of the unidirectional porous metal bearings 1, and passed via passages between the main axis 3 and the metal bearings 1 and between the main axis 3 and the metal ring 15, and then discharged through the exhaust groove 7, the exhaust channel 8 and the air outlet 12. The air is circulated as indicated by arrows of FIGS. 5A and 5B.

In this operation, a passage 25 as an air/oil film is formed between the main axis 3 and the unidirectional porous metal bearings 1, and between the main axis 3 and the metal ring 15 due to the presence of the air supplied to the unidirectional porous metal bearings 1. Therefore, the main axis 3 may be rotated at a high speed without any of the contact or friction between the main axis 3 and the unidirectional porous metal bearings 1.

As described above, the aerostatic bearing spindle system using the unidirectional porous metal as the air bearings may be useful to reduce the deformation and burning on of the main axis caused by vibration, abrasion and friction heat to the maximum extent by forming an air/oil film in a region that is in direct contact with the main axis when the main axis is rotated by the air.

While the present invention has been shown and described in connection with the exemplary embodiments, it will be apparent to those skilled in the art that modifications and variations can be made without departing from the spirit and scope of the invention as defined by the appended claims.

What is claimed is:

1. An aerostatic bearing spindle system using a unidirectional porous metal, comprising:
    a motor housing;
    a bearing housing disposed in contact with the motor housing and formed integrally in the motor housing;
    a main axis installed through inner central regions of the motor housing and the bearing housing;
    a motor installed to surround the main axis disposed inside the motor housing; and
    a plurality of unidirectional porous metal bearings installed to coaxially surround a circumferential surface of the main axis disposed inside the bearing housing and having a plurality of pores formed therein, the pores having a predetermined directionality with respect to the circumferential surface,
    wherein an air inlet is formed integrally in predetermined space between the motor housing and the bearing housing and arranged in parallel to the main axis, and an air outlet is formed integrally in the other space of the motor housing and the bearing housing and arranged in parallel to the main axis,
    wherein a plurality of air supply channels are formed integrally between the air inlet and each of the unidirectional porous metal bearings, and air supply grooves are formed integrally between the air supply channels and each of the porous metal bearings,
    wherein a plurality of the porous metal bearings are installed spaced apart from each other, and metal rings having an exhaust groove formed thereon are each installed between the porous metal bearings, and
    wherein an exhaust channel communicating with the exhaust groove is formed integrally between the metal ring and the air outlet.

2. The aerostatic bearing spindle system of claim 1, wherein a plurality of the pores formed in the circumferential surfaces of the unidirectional porous metal bearings are formed in a 90° direction with respect to the central axes of the unidirectional porous metal bearings.

3. The aerostatic bearing spindle system of claim 1, wherein a plurality of the pores formed in the circumferential surfaces of the unidirectional porous metal bearings are formed in a 45° direction with respect to the central axes of the unidirectional porous metal bearings.

* * * * *